Oct. 10, 1967 A. N. MILSTER 3,345,818
TANDEM MASTER CYLINDER
Filed Jan. 10, 1966
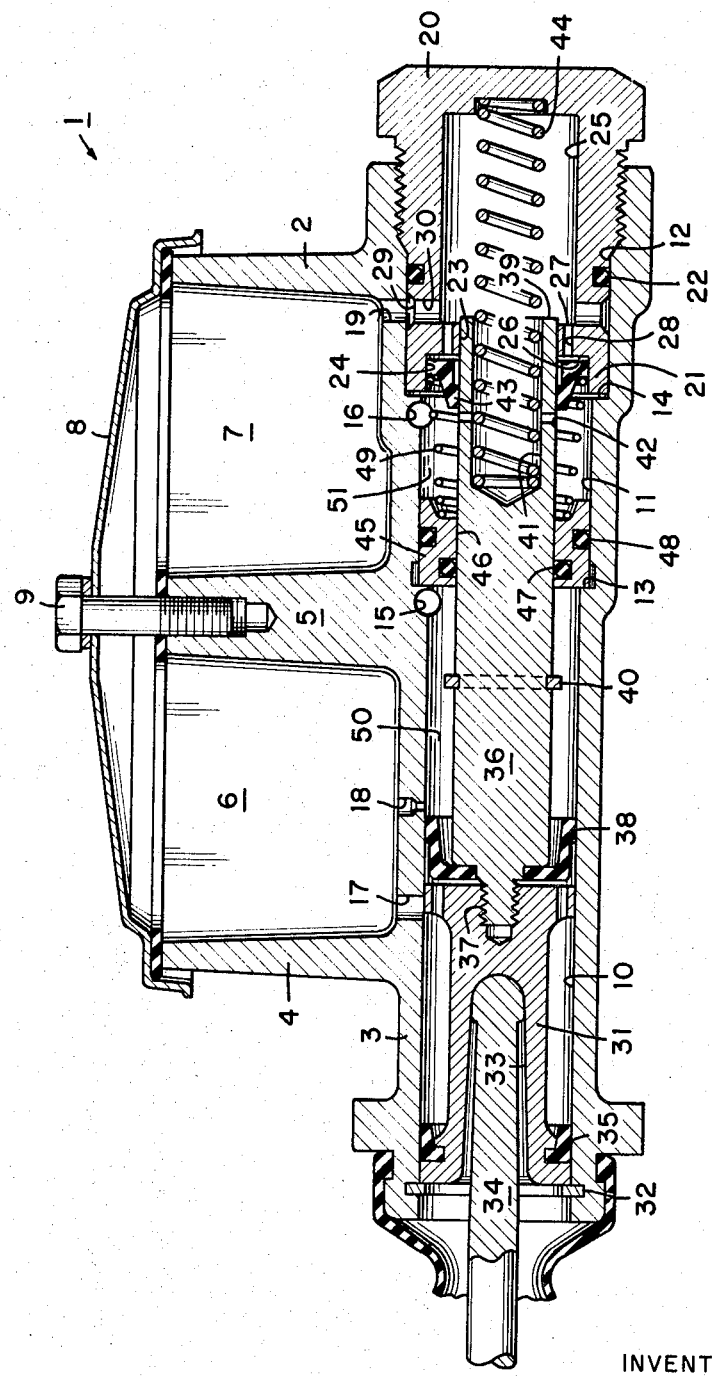
INVENTOR
ARTHUR N. MILSTER
BY
Joseph E. Papin

United States Patent Office

3,345,818
Patented Oct. 10, 1967

3,345,818
TANDEM MASTER CYLINDER
Arthur N. Milster, Richmond Heights, Mo., assignor to Wagner Electric Corporation, St. Louis, Mo., a corporation of Delaware
Filed Jan. 10, 1966, Ser. No. 519,545
8 Claims. (Cl. 60—54.6)

This invention relates to fluid pressure systems and more particularly to a tandem master cylinder for use in a dual fluid pressure system.

The principal object of the present invention is to provide a tandem master cylinder with a floating piston therein which automatically positions itself to establish fluid pressures in the separate branches of a dual fluid pressure system in a predetermined ratio to one another.

Another object of the present invention is to provide a tandem master cylinder with a floating piston therein to establish fluid pressures in the separate branches of a dual fluid pressure system in a predetermined ratio and which, in case of failure in one of the fluid pressure branches, will seal off the broken branch while assisting in the establishment of fluid pressure in the other fluid pressure branch.

Another object of the present invention is to provide a tandem master cylinder having a first piston member movable in the bore of said master cylinder, and a floating piston movable on the periphery of said first piston member and defining therewith a pair of separate fluid pressure chambers for supplying fluid pressure to the separate branches of a dual fluid pressure system, and said floating piston being movable in response to fluid pressure in one of said fluid pressure chambers to increase the fluid pressure in the other of said fluid pressure chambers to a value proportional to the fluid pressure in said one fluid pressure chamber.

Still another object of the present invention is to provide a tandem master cylinder in which the portholes connecting the reservoirs with the separate fluid pressure chambers are closed at substantially the same instant, rather than sequentially, so that the initial pedal stroke establishes fluid pressure in both chambers substantially simultaneously.

Still another object of the present invention is to provide a tandem master cylinder of simplified construction and economy of manufacture.

Briefly, the present invention comprises a tandem master cylinder having first piston means movable therein, floating piston means movable on said first piston means and defining therewith a pair of pressure fluid chambers, said first piston means being movable in response to an applied force to establish fluid pressure in one of said pressure fluid chambers, and said floating piston means being movable in response to the established fluid pressure in said one pressure fluid chamber to establish fluid pressure in the other of said pressure fluid chambers.

These and other objects and advantageous features will become apparent hereinafter by referring to the appended specification and the accompanying drawing which is a cross-sectional view of a tandem master cylinder embodying the present invention.

A tandem master cylinder or fluid pressure generating means 1 is provided with a housing 2 having integrally formed cylinder and reservoir portions 3, 4 therein. A transversely extending wall 5 is integrally provided on the housing separating the reservoir portion 4 into divided pressure fluid reservoir or sump chambers 6, 7, and a closure assembly 8 is secured in place on said reservoir portion by a bolt 9 which is threadedly received in the wall 5 to prevent the entry of foreign particles into said sump chambers.

The cylinder portion 3 is provided with an axially aligned bore 10 and counterbores 11, 12 therethrough, and annular shoulders or abutments 13, 14 are respectively provided between said bore and counterbore 10, 11 and between said counterbores 11, 12. Outlet ports 15, 16 are provided in the housing 2 intersecting with the bore and counterbore 10, 11 adjacent to the shoulders 13, 14, respectively. Axially spaced supply and compensation ports 17, 18 are provided in the housing 2 connected between the sump chamber 6 and the housing bore 10 adjacent to the mid-portion thereof, and a supply passage 19 is also provided in said housing connected between the sump chamber 7 and the housing counterbore 12 adjacent to the mid-portion thereof.

A plug or bore closure member 20 is threadedly received in the rightward end of the housing counterbore 12 having an inner end 21 in abutting engagement with the housing shoulder 14, and a peripheral seal 22 is carried on said plug near the mid-portion thereof on sealing engagement with said housing counterbore. A bore 23 is provided in the plug 20 axially interposed between opposed counterbores 24, 25, said bore and counterbores defining opposed annular shoulders 26, 27 at the respective junctures thereof, and a plurality of supply ports 28 are provided in said plug radially spaced outwardly of the bore 23 and extending axially between the plug shoulders 26, 27. The plug 20 is provided with a peripheral groove 29 between the inner end 21 thereof and the peripheral seal 22, and a plurality of cross-passages 30 are provided in said plug between said peripheral groove and the plug counterbore 25 connecting said plug counterbore in open pressure fluid communication with the supply passage 19 and sump chamber 7.

A primary piston assembly 31 is slidably received in the housing bore 10 and retained against displacement therefrom by a snap ring and groove assembly 32 provided adjacent to the leftward end of said housing bore, and an axially extending recess 33 is provided in the leftward end of said piston to pivotally receive the driving end of an operator controlled push rod 34. A secondary piston seal 35 is carried on the piston 31 adjacent to the leftward end thereof closing the housing bore 10, and a piston extension 36 is threadedly connected at 37 to the rightward end of said piston. A primary seal 38 is fixedly interposed or carried between the piston and extension 31, 36 and is normally in sealing engagement between the housing bore 10 and the piston 31, and said extension extends coaxially through the housing bore and counterbore 10, 11 having a rightward or free end 39 thereon slidably received in the plug bore 23 and projecting into the plug counterbore 25, and a safety stop or abutment 40 is provided on said extension adjacent to the mid-portion thereof. A blind axial bore 41 is provided in the extension free end 39, and a plurality of compensation ports 42 extend radially through the extension 36 between the peripheral surface thereof and said blind bore, and an annular seal 43 is positioned in sealing engagement between the plug counterbore and shoulder 24, 26 and said peripheral surface of said extension. A return spring 44 is biased between the plug 20 and the extension 36 to normally urge the piston 31 toward its retracted or inactive position in abutment with the snap ring 32, as shown.

A floating piston 45 is slidably received in the housing counterbore 11 and is provided with an axial bore 46 therethrough in which extension 36 is slidable, and O-ring seals 47, 48 are carried in said floating piston in sealing engagement with said extension and said housing counterbore. A return spring 49 is positioned in the counterbore 11 in concentric relation with the extension 36 between the annular seal 43 and the floating piston 45 normally urging said floating piston into abutment with the housing shoulder 13 and normally urging said annular seal into engagement with the plug shoulder 26 to close the supply ports 28. It should be noticed that a fluid pressure generating chamber 50 is defined in the housing bore and counterbore 10, 11 between the piston seal 38 and the floating piston 45 in open pressure fluid communication with the outlet port 15 and normally connected with the sump chamber 6 through the compensation port 18 and that another fluid pressure generating chamber 51 is defined in the housing counterbore 11 between said floating piston and the annular seal 43 in open pressure fluid communication with the outlet port 16 and normally connected with the sump chamber 7 through the supply port 19, the chamber formed by the counterbore 25, extension 36 and annular seal 43, and the compensation ports 42. To complete the description of the tandem master cylinder 1, it should also be noticed that the primary seal 38 and compensation port 18 define a valve controlling pressure fluid communication between the fluid pressure generating chamber 50 and the sump chamber 6 and that the seal 43 and compensation ports 42 define another valve controlling pressure fluid communication between the fluid pressure generating chamber 51 and the sump chamber 7.

In the normal operation of the tandem master cylinder 1 with the component parts in their original positions, as shown in the drawings and as hereinbefore described, a manually applied force to the push rod 34 urges the piston 31 and the extension 36 rightwardly relative to the floating piston 45, whereby the primary seal 38 passes the compensating port 18 to close the valve defined thereby and interrupt pressure fluid communication between the sump chamber 6 and the fluid pressure chamber 50. This rightward movement of the extension 36 also serves to move the compensating ports 42 past the annular seal 43 to close the valve defined thereby and interrupt pressure fluid communication between the sump chamber 7 and the fluid pressure chamber 51 substantially simultaneously with the closing of the compensating port 18. Further rightward movement of the primary piston 31 and seal 38 establishes fluid pressure in the chamber 50 which is displaced through the outlet port 15 to one of the branches of the dual fluid pressure system (not shown). The established fluid pressure in the chamber 50 also acts on the leftward end of the floating piston 45 to urge it rightwardly and establish fluid pressure in the chamber 51 which is displaced through the outlet port 16 to the other branch of the dual fluid pressure system (not shown). In the embodiment shown for illustration, the effective fluid pressure responsive end areas of the floating piston 45 exposed to fluid pressure in the chambers 50 and 51 are equal, and said floating piston will automatically move to a position establishing fluid pressure in the chambers 50 and 51 which is substantially equal. However, it is obvious that the floating piston 45 could also be provided with fluid pressure responsive end areas which are in a predetermined ratio with one another and the tandem master cylinder 1 would then establish fluid pressures in the chambers 50 and 51 in a predetermined ratio.

When the desired braking effect is obtained, the manually applied force is removed from the push rod, and the displaced pressure fluid is returned to the chamber 50, 51 and the primary and floating pistons 31 and 45 are returned to their original positions by the return springs 44 and 49, respectively. As the manually applied force is removed, a partial vacuum may be momentarily created in the chambers 50 and 51, and the flow of pressure fluid from the sump chambers 6, 7 through the supply ports 17, 19 into the bore 10 between the secondary seal 35 and the primary seal 38, and into the chamber defined by the counterbore 25, extension 36 and annular seal 43, respectively, permits pressure fluid compensation in the chambers 50 and 51. This pressure fluid compensation in the chambers 50 and 51 is accomplished by the partial vacuum therein collapsing the lips of the primary seal 38 and the annular seal 43 to permit pressure fluid flow from the bore 10 past said primary seal into the chamber 50 and from the chamber defined by the counterbore 25, extension 36 and annular seal 43 through the supply ports 28 into the chamber 51.

In the event of a leak in the fluid pressure branch connected with the outlet port 15, the applied force on the push rod 34 will close the compensating ports 18 and 42, as previously described, but the rightward movement of the primary piston 31 and seal 38 fails to establish fluid pressure in the chamber 50. Therefore, the applied force on the push rod 34 moves the primary piston 31 and extension 36 rightwardly and abuttingly engages the safety stop 40 with the floating piston 45 to drive said floating piston rightwardly and establish fluid pressure in the chamber 51 which is displaced through the outlet port 16 to the other branch of the dual fluid pressure system to effect a safe braking of the vehicle.

In the event of a leak in the fluid pressure branch connected with the outlet port 16, the applied force on the push rod 34 moves the primary piston 31 and extension 36 rightwardly to close the compensating ports 18 and 42, as previously described, and the rightward movement of the primary piston 31 and seal 38 establishes fluid pressure in the chamber 50 which is displaced through the outlet port 15 into the branch of the dual fluid pressure system connected thereto. As the established fluid pressure in the chamber 50 acts on the leftward end of the floating piston 45 to urge it rightwardly, there is no fluid pressure established in the chamber 51 to resist this rightward movement and said floating piston assembly moves to a position abuttingly engaging the leftward end 21 of the plug member 20. The floating piston 45 thereby serves as a fixed rightward end of the chamber 50 and prevents pressure fluid flow from the chamber 50 to the chamber 51 so that the further rightward movement of the primary piston 31 and seal 38 in response to the applied force will continue to establish fluid pressure in the chamber 50 which is displaced through the outlet port 15 to effect a safe braking of the vehicle.

From the foregoing, it is now apparent that a novel tandem master cylinder meeting the objects set out hereinbefore is provided and that changes or modifications as to the precise configurations, shapes and details of the construction set forth in the disclosure by way of illustration may be made by those skilled in the art without departing from the spirit of the invention, as defined by the claims which follow.

The embodiments of the invention in which an exclusive property or privilege is claimed are defined as follows:

1. A tandem master cylinder comprising a housing having a pair of pressure fluid reservoirs therein, a pair of fluid pressure chambers in said housing, passage means in said housing normally connecting one of said chambers in pressure fluid communication with one of said reservoirs, first piston means movable in said housing between said chambers, second piston means movable in said housing controlling said passage means and including extension means extending through said first piston means and said chambers, and means in said housing including said extension means defining other passage means normally connecting the other of said chambers in pressure fluid communication with the other of said reservoirs, said second piston means and said extension means being movable in response to an applied force toward a position closing said first named and other passage means to interrupt pressure fluid communication between said chambers and said reservoirs and establish fluid pressure in said one chamber, and said first piston means being movable in response to the established fluid pressure in said one chamber toward a position establishing fluid pressure in said other chamber in a predetermined ratio with that established in said one chamber.

2. The tandem master cylinder according to claim 1, wherein said other passage means includes a third chamber in said housing in pressure fluid communication with said other reservoir, and a passage in said extension means and movable therewith between a normal position connecting said other and third chambers in pressure fluid communication and an applied position wholly within said third chamber to interrupt pressure fluid communication between said other and third chambers, said passage being movable toward its applied position in response to the applied force movement of said extension means.

3. The tandem master cylinder according to claim 2, comprising sealing means in said housing between said other and third chambers and in peripheral sealing engagement with said extension means, said passage being moved from its normal position through said sealing means toward its applied position within said third chamber.

4. The tandem master cylinder according to claim 1, including sealing means in said housing normally spaced from said first piston means and having an aperture therein, said extension means extending through said aperture and being in sealing engagement with said sealing means, said sealing means and said extension means defining with said first piston means said other chamber, and said second piston means and said extension means defining with said first piston means said one chamber.

5. The tandem master cylinder according to claim 4, wherein said other passage means includes a third chamber in said housing connected in pressure fluid communication with said other reservoir and separated from said other chamber by said sealing means and said extension means, and a passage in said extension means having one end normally connected with said third chamber and the other end thereof normally connected with said other chamber, said second piston means and said extension means being responsive to the applied force to move said other end of said passage into engagement with said sealing means to interrupt pressure fluid communication between said other and third chambers substantially simultaneously with the closing of said first named passage means.

6. The tandem master cylinder according to claim 1, including abutment means in said housing intermediate said one and other chambers for abutting engagement with said first piston means, and resilient means normally urging said first piston means toward abutting engagement with said abutment means.

7. The tandem master cylinder according to claim 1, including driving means on said extension means for engagement with said first piston means, said second piston means and said extension means being movable in response to the applied force to engage said driving means with said first piston means and mechanically drive said first piston means toward a position establishing fluid pressure in said other chamber in the event of fluid pressure failure in said one chamber.

8. The tandem master cylinder according to claim 1, including a bore in said first piston means extending therethrough, said extension means extending through said bore and being in sliding sealing engagement with said first piston means, said first piston means being movable independently of said extension means in response to the established fluid pressure in said one chamber.

References Cited
UNITED STATES PATENTS 2,060,854 11/1936 Carroll _____ 60—54.6
3,174,285 3/1965 Stelzer _____ 60—54.6

MARTIN P. SCHWADRON, *Primary Examiner.*

ROBERT R. BUNEVICH, *Examiner.*